United States Patent [19]

Aoyagi et al.

[11] Patent Number: 4,679,177

[45] Date of Patent: Jul. 7, 1987

[54] UNDERWATER COMMUNICATION SYSTEM

[75] Inventors: Masaru Aoyagi; Makoto Saitoh, both of Tokyo, Japan

[73] Assignee: NEC Corporation, Tokyo, Japan

[21] Appl. No.: 831,204

[22] Filed: Feb. 20, 1986

[30] Foreign Application Priority Data

Feb. 20, 1985 [JP] Japan ................................. 60-30627

[51] Int. Cl.[4] .......................................... H04B 11/00
[52] U.S. Cl. .................................... 367/132; 367/134
[58] Field of Search ................................. 367/132, 134

[56] References Cited

U.S. PATENT DOCUMENTS

| 3,909,773 | 9/1975 | Saltzer | 367/134 |
| 3,958,215 | 5/1976 | Bianco | 367/134 |
| 4,489,405 | 12/1984 | Tendler | 367/116 |
| 4,563,758 | 1/1986 | Paternostro | 367/134 |

Primary Examiner—Richard A. Farley
Attorney, Agent, or Firm—Sughrue, Mion, Zinn, Macpeak & Seas

[57] ABSTRACT

An underwater communication system of the present invention comprises a transmitter including message inputting means having keys, each being assigned to each word, code converting means for converting a key input entered through the inputting means to a code assigned to the key input, modulator means responsive to the code for performing modulation, and transmit transducer means for converting an output of the modulator means to an acoustic wave, and a receiver including a receiver transducer means for reconverting the incoming acoustic wave from the transmitter to an electric signal, demodulator means for demodulating the electric signal to generate the code, speech synthesis means responsive to the demodulated code for producing a word corresponding to the code as a speech, and speaker means for outputting the synthesized speech.

1 Claim, 3 Drawing Figures

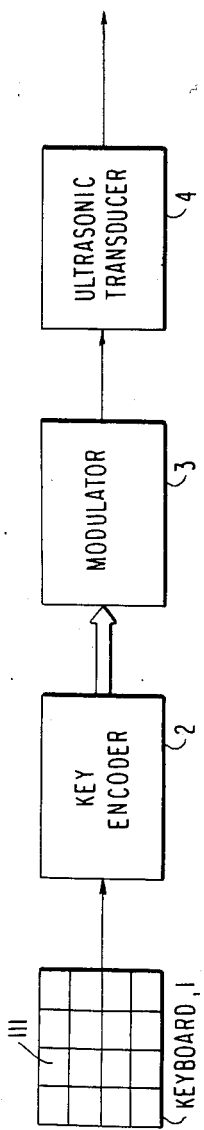
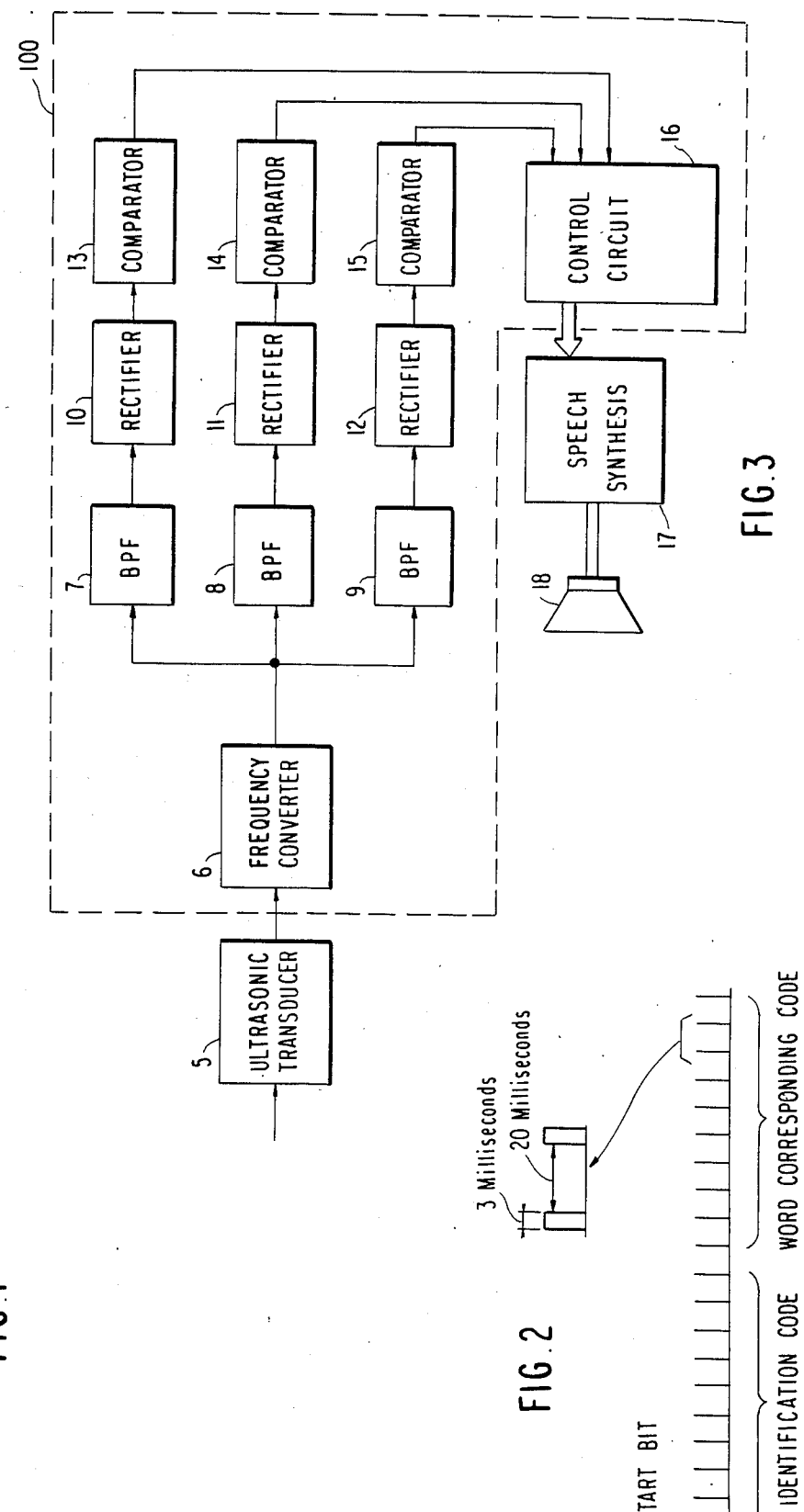

UNDERWATER COMMUNICATION SYSTEM

FIELD OF THE ART

The present invention relates to an underwater communication system which allows a free-swimming diver to communicate with another diver or divers, a surface vessel, or an underwater vessel and, more particularly, to an underwater communication system which utilizes speech synthesis.

PRIOR ART

Scuba diving is attracting ever increasing attention in the field of marine sports. For scuba diving, a license system is employed because the lack of sufficient knowledge of air-bottles and others as well as untrained manipulation of the same invites fatal accidents. A person may be licensed for scuba diving by attending institute classes where knowledge and manipulation method necessary in practice are provided. Usually, in institute classes an instructor first gives participants general precautions and, then, actual instructions underwater as are represented by movements of his or her hands, feet, etc. However, such instructor's actions fail to sufficiently impart the intentions to the participants and are sometimes erroneously interpreted to result in accidents. For this reason, an underwater communication system for good understanding between persons underwater has long been desired.

The need for an underwater communication system with such a capability has also been raised in relation to a diver who works underwater such as for civil engineering projects and to a person on a surface vessel or an underwater vessel who gives instructions to the diver.

A communication apparatus heretofore proposed for implementing such an underwater communication comprises a speech sensor which is to be fitted on the diver's throat, a modulator for frequency-modulating a speech signal outputted from the sensor, and an ultrasonic transducer for emitting the modulated signal as an acoustic wave.

PROBLEM TO BE SOLVED BY THE INVENTION

The problem with the prior art underwater communication apparatus is that intelligible speeches are unachievable partly because (1) the diver holds a mouthpiece of an air hose between the teeth, partly because (2) the speech sensor is placed on the throat, and partly because (3) the diver cannot utter accurate sounds underwater due to the pressurized ambience. In addition, for a diver uttering underwater is hard labor which would significantly accelerate consumption of oxygen and, thereby, shorten the duration of the dive.

It is therefore an object of the present invention to provide an underwater communication system which is capable of transmitting speeches with a minimum of burden on a diver and allowing a receive side to reproduce intelligible speeches.

An underwater communication system of the present invention comprises a transmitter including message inputting means having keys, each being assigned to each word, code converting means for converting a key input entered through the inputting means to a code assigned to the key input, modulator means responsive to the code for performing modulation, and transmit transducer means for converting an output of the modulator means to an acoustic wave, and a receiver including a receive transducer means for reconverting the incoming acoustic wave from the transmitter to an electric signal, demodulator means for demodulating the electric signal to generate the code, speech synthesis means responsive to the demodulated code for producing a word corresponding to the code as a speech, and speaker means for outputting the synthesized speech.

BRIEF DESCRIPTION OF THE DRAWINGS

FIGS. 1 and 3 are block diagrams showing one embodiment of the present invention; and FIG. 2 shows an output format which is produced by a transmitter in accordance with the present invention.

EMBODIMENT

The present invention will be described in detail with reference to the accompanying drawings.

An underwater communication system embodying the present invention generally comprises a transmitter shown in FIG. 1 and a receiver shown in FIG. 3.

Referring to FIG. 1, the transmitter includes a message entering keyboard 1 having multiple keys 111, each being assigned to a particular message. For example, instructions "STOP", "DANGER", "FORWARD" and others and identification (ID) numbers assigned to individual divers are provided one on each of the keys 111. The output of any of the keys 111 which has been depressed is converted by a key encoder 2 to a code representative of which code has been depressed (hereinafter the code is referred to as "a word corresponding code"). A modulator 3 performs a frequency shift keying (FSK) operation using the word corresponding code. Specifically, the modulator 3 produces a 40 kHz signal responsive to "0" of the word corresponding code and a 39 kHz signal responsive to "1" and, prior to the word corresponding code, outputs a 41 kHz signal as a start signal which designates the beginning of a code. An ultrasonic transducer 4 converts the electric signal outputted by the modulator 3 to an acoustic wave and then emits it to the water. The modulator 3 may readily be implemented by, for example, HD6301V (a microprocessor available from Hitach), and the key encoder 2 by 74C923 (a key encoder available from National Semiconductor). Hence, further details of the circuits 2 and 3 will not be described.

Referring to FIG. 2, the output format of the transmitter of FIG. 1 is shown. As shown, the transmission frame is made up of a single start bit, a 10-bits diver identification (ID) code, and a 10-bits word corresponding code. The bits individually have a duration of 3 milliseconds and appear in predetermined intervals of 20 milliseconds. The ID code corresponds to any of the previously stated ID numbers.

Referring to FIG. 3, the receiver used for the present invention includes an ultrasonic transducer 5 adapted to reconvert the acoustic wave emitted by the transmitter back to the electric signal. The output of the transducer 5 is demodulated by a demodulator 100 to the start bit, the word corresponding code, and the ID code. The demodulator 100 comprises a frequency converter 6 for converting the 41 kHz, the 40 kHz and the 39 kHz signals, which respectively are associated with the start bit and "0" and "1" of the code, to a 5 kHz, a 4 kHz and a 3 kHz signals, respectively. The demodulator 100 further comprises bandpass filters (BPF) 7 to 9 for picking up respectively those three frequency outputs from the frequency converter 6, rectifier 10 to 12 for rectifying respectively outputs of the BPFs, comparators 13 to 15 each adapted to compare an output of its associated rectifier 10 to 12 with a predetermined reference value, and a control circuit 16. Implemented by a microprocessor, the control circuit 16 decides whether the received signal is meant for the own receiver based on the diver ID code. If it is, the control circuit 16 delivers to a speech synthesis circuit 17 an address signal for causing the circuit 17 to produce a speech which is associated with the word corresponding code. In response to the address signal, the speech synthesis circuit 17 produces through a speaker 18 an audible message which is associated with the incoming word corresponding code. The control circuit 16 may also be implemented by the previously mentioned microprocessor HD6301V (Hitach), while the circuit 17 may be implemented by μPD7756 (a speech synthesis circuit available from NEC).

The transmitter and the receiver, together with their power supplies, are each provided with water-tight sealing and may be put on the diver's arm, waist or the like.

The operations of the underwater communication system having the above construction and arrangement will be described with reference to FIGS. 1 to 3. Assume, for example, that the instructor is to give an instruction "FORWARD" to the fourth one of four divers. First, the instructor depresses a particular one of the keys 111 (FIG. 1) which is indicative of the diver ID number "4" and, then, another key indicative of the instruction "FORWARD". The ID number "4" and the subsequent message "FORWARD" are sequentially coded to particular codes by the key encoder 2. In response to those codes, the demodulator 3 prepares a frame which is made up of a start bit, an ID code and a word corresponding code as shown in FIG. 2 and, thereafter, FSK-modulates the resultant start bit and the codes. Specifically, it produces a frequency 41 kHz responsive to the start bit, and frequencies 40 kHz and 39 kHz responsive respectively to "0" and "1" of the code. Subsequently, the modulated signal is converted to an ultrasonic wave by the transducer 4 to be emitted to the water.

At each diver's receiver, the receiver transducer 5 (FIG. 3) reconverts the incoming signal to the electric signal which is then applied to the frequency converter 6. To facilitate the subsequent processing, the frequency converter 6 converts the modulated signals of 41 kHz to 39 kHz to lower frequencies of 5 to 3 kHz, respectively, the frequencies 5 kHz to 3 kHz being applied to the demodulator 100. In response, the demodulator circuit 100 demodulates the start bit and "1" and "0" of the ID code by means of the BPFs 7 to 9, rectifier 10 to 12 and comparators 13 to 15 and, then, delivers demodulated outputs thereof to the control circuit 16. Seeing that the ID code is designating the own receiver, the control circuit 16 of the diver 4 responds to the word corresponding code associated with the instruction "FOR-WARD", which follows the ID code, by delivering an address code to the speech synthesis circuit 17 for reading out the word "FORWARD". Then, the circuit 17 produces an audible message "FORWARD" through the speaker 18, so the diver 4 can hear it.

The message "FORWARD" may be imparted to all the four divers in the same manner as above described except for the depression of a key which designates all the divers and the "FORWARD" key. An alternative and keysaving approach for the delivery of the same instruction to all the participants is programming the processor which constitutes the modulator 3, such that it is activated when only any of the instruction keys is depressed. In practice, this approach may be implemented by programming the modulator 3 such that if the code entered for the first time is none of the predetermined ID codes, the processor 3 constructs a frame made up of a start bit, an all-member ID code and a word corresponding code responsive to the input code and, then, modulated them.

While the foregoing description has concentrated to one-way communication between an instructor and a plurality of participants, it will be needless to mention that bilateral communication may be implemented by constructing the transmitter and the receiver in a single unit.

EFFECT OF THE INVENTION

It will be seen from the foregoing that in accordance with the present invention a free-swimming diver is capable of transmitting a speech simply by depressing keys and, therefore, is free from a substantial part of burden heretofore born, compared with the prior art system which relies on direct utterance. Further, since a receiver synthesizes a speech responsive to a word corresponding code which is sent to the receiver by a transmitter, the speech sounds far clearer than those which are recovered by demodulating incoming demodulated signals as has been the case with the prior art system.

What is claimed is:

1. An underwater communication system comprising:
   a transmitter including message inputting means having keys each being assigned to each word, code converting means for converting a key input entered through said inputting means to a code assigned to the key input, modulator means responsive to the code, for performing modulation, and transmit transducer means for converting an output of said modulator means to an acoustic wave, and
   a receiver including receive transducer means for reconverting the incoming acoustic wave from said transmitter to an electric signal, demodulator means for demodulating the code from the electric signal, speech synthesis means responsive to the demodulated code for producing a word corresponding to the code, and speaker means for outputting the synthesized speech.

* * * * *